(12) United States Patent
Joesten

(10) Patent No.: US 11,469,579 B2
(45) Date of Patent: Oct. 11, 2022

(54) SMART CORRUGATED HOSE

(71) Applicant: LEONI KABEL GMBH, Roth (DE)

(72) Inventor: Bernd Joesten, Laatzen (DE)

(73) Assignee: BIZLINK INDUSTRY GERMANY GMBH, Roth (DE)

(*) Notice: Subject to any disclaimer, the term of this patent is extended or adjusted under 35 U.S.C. 154(b) by 373 days.

(21) Appl. No.: 16/617,123

(22) PCT Filed: Apr. 11, 2018

(86) PCT No.: PCT/EP2018/059325
§ 371 (c)(1),
(2) Date: Nov. 26, 2019

(87) PCT Pub. No.: WO2018/224204
PCT Pub. Date: Dec. 13, 2018

(65) Prior Publication Data
US 2020/0259319 A1    Aug. 13, 2020

(30) Foreign Application Priority Data
Jun. 6, 2017  (DE) .......................... 102017209509.1

(51) Int. Cl.
H02G 3/04 (2006.01)
(52) U.S. Cl.
CPC ........ H02G 3/0468 (2013.01); F16L 2201/30 (2013.01)
(58) Field of Classification Search
CPC ............ F16L 11/12; F16L 11/11; F16L 55/00; G01M 3/04; G01M 3/26; G01M 3/38; G01M 3/047; H02G 3/04

USPC ................. 138/121, 122, 104; 73/40, 40.5 R
See application file for complete search history.

(56) References Cited

U.S. PATENT DOCUMENTS

| | | | | |
|---|---|---|---|---|
| 3,472,062 A * | 10/1969 | Owen | ................. | G01M 3/3218 138/104 |
| 5,129,428 A * | 7/1992 | Winter | ................... | F16L 11/112 138/104 |
| 6,550,499 B1 * | 4/2003 | Pai | ......................... | F16L 11/12 138/104 |
| 6,559,437 B1 | 5/2003 | Pope, Jr. et al. | | |
| 8,789,562 B2 * | 7/2014 | Kagoura | ................. | F16L 11/12 138/104 |
| 9,366,597 B2 * | 6/2016 | Zandiyeh | ............. | G01M 3/047 |
| 2004/0065377 A1 | 4/2004 | Whitely | | |
| 2004/0108011 A1 * | 6/2004 | Eck | ....................... | F16L 11/127 138/104 |

(Continued)

FOREIGN PATENT DOCUMENTS

| | | |
|---|---|---|
| DE | 102006056235 A1 | 5/2008 |
| WO | 2016012049 | 1/2016 |
| WO | 2017053712 | 3/2017 |

Primary Examiner — Patrick F Brinson
(74) Attorney, Agent, or Firm — Tarolli, Sundheim, Covell & Tummino LLP

(57) ABSTRACT

The present invention relates to a corrugated hose. The corrugated hose comprises at least one conductor arrangement. The conductor arrangement is arranged on the corrugated hose or introduced into the corrugated hose in such a manner that any damage to the at least one conductor arrangement causes a change in a signal carried in the at least one conductor arrangement such that damage to or a state change in the corrugated hose can be derived from the change in the signal.

15 Claims, 2 Drawing Sheets

(56) References Cited

U.S. PATENT DOCUMENTS

2013/0220466 A1\* 8/2013 Zandiyeh ............... F16L 55/00
138/104
2014/0345740 A1 11/2014 Demanze \* cited by examiner

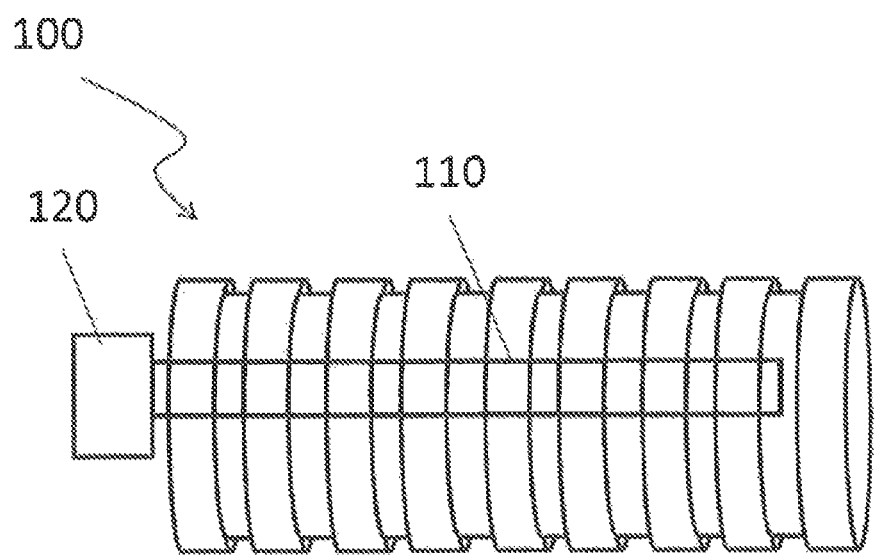
Fig.1A
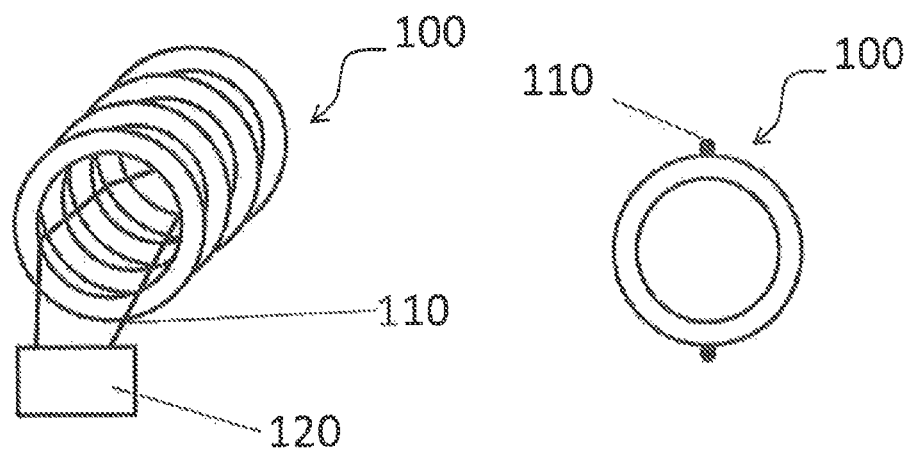
Fig.1B
Fig.1C

SMART CORRUGATED HOSE

RELATED APPLICATIONS

This application filed under 35 U.S.C § 371 is a national phase application of International Application Serial Number PCT/EP2018/059325, filed Apr. 11, 2018, which claims the benefit of German Application No. 10 2017 209 509.1 filed Jun. 6, 2017, the subject matter of which are incorporated herein by reference in their entirety.

TECHNICAL FIELD

The present invention relates to a corrugated hose with at least one conductor arrangement.

BACKGROUND ART

Corrugated hoses are hoses manufactured from a flexible material in a bellows-shaped design. Corrugated hoses are used for the carrying and integration of cables and components. They serve further to gather and protect the integrated cables and components. A corrugated hose with integrated cables and components is generally termed a cable-hose assembly. In similar or repetitive movement sequences of a machine connected to the cable-hose assembly, the cable-hose assembly is subjected to corresponding wear. The wear is expressed in material abrasion of the profile of the corrugated hose. The material abrasion can cause the formation of a hole and can even result in the total tearing of the corrugated hose. In consequence, the cables and components lying inside are no longer protected and are therefore subjected to direct wear. This can lead to unscheduled installation shutdowns.

A requirement therefore exists to monitor the current state of a corrugated hose and thereby at least to reduce unscheduled installation shutdowns.

DISCLOSURE OF THE INVENTION

According to one aspect, a corrugated hose is provided. The corrugated hose has at least one conductor arrangement. The conductor arrangement is mounted on the corrugated hose or introduced into the corrugated hose in such a manner that damage to the at least one conductor arrangement causes a change in a signal carried in the at least one conductor arrangement such that damage to or a state change in the corrugated hose can be deduced from the change in the signal.

A state change of the corrugated hose can be understood as a deviation, present to a certain degree, for example, from the original state or correct state of the corrugated hose. The state change may be a change in the state of the corrugated hose, for example, in such a manner that it indicates an early or imminent rupture of the corrugated hose. The damage to the corrugated hose can be a rupture of the corrugated hose. Thus an early rupture of the hose can be deduced, for example, from damage to the conductor arrangement, e.g. in the event of a tear in the conductor arrangement.

This yields the advantage that if the corrugated hose is loaded too heavily, a signal change occurs, whereupon a custodian of the associated installation can react with a prompt servicing action before total failure of the installation occurs.

Corrugated hoses and corrugated tubes with a corresponding profile have a proven longevity and are very flexible. This makes them suitable for their use among other things for the field of robotics. Due to the profiling of the corrugated hose or corrugated tube, the introduction or attachment of a conductor arrangement is difficult but technically possible. Due to the technical complexity, consideration was not hitherto given among experts to introducing or attaching a conductor arrangement to a corrugated hose/a corrugated tube. Only the inventor has overcome this prejudice existing hitherto and has introduced a conductor arrangement into a corrugated hose/a corrugated tube or attached a conductor arrangement to a corrugated hose/a corrugated tube. The realisation described here can be used in principle also in other hoses or tubes.

The conductor arrangement can be mounted on the corrugated hose or introduced into the corrugated hose in such a manner that damage to the corrugated hose also leads to damage to the at least one conductor arrangement such that a change is caused in a signal carried in the at least one conductor arrangement such that damage to the corrugated hose can be deduced from the change in the signal. Thus damage to the corrugated hose can be deduced from the change in the signal.

The corrugated hose can be a corrugated tube, for example a plastic corrugated tube or a protective tube for sheathing users such as cables and pipes.

The at least one conductor arrangement can be introduced into a liner of the corrugated hose. The at least one conductor arrangement can be mounted on an inner side of the corrugated hose, e.g. on an inner side of a liner of the corrugated hose.

The at least one conductor arrangement can be attached to a liner of the corrugated hose or to the corrugated hose.

The at least one conductor arrangement can be introduced into an interior space of the corrugated hose. The introduction or mounting/attachment can take place during extrusion of the corrugated hose.

Generally speaking, the at least one conductor arrangement can be attached to the corrugated hose or introduced into the corrugated hose.

Due to the introduction or mounting/attachment of the conductor arrangement into or to the corrugated hose, permanent state monitoring of the corrugated hose is made possible.

The conductor arrangement can have one or more conductors or be formed of one or more conductors. According to a possible realisation the conductor arrangement has a single conductor or is formed from a single conductor.

The at least one conductor arrangement can have an electric conductor arrangement or be formed as such. The at least one conductor arrangement can have a high-frequency conductor arrangement and/or maximum-frequency conductor arrangement or be formed as such. The at least one conductor arrangement can have an optical conductor arrangement or be formed as such.

The advantage of a suitable high-frequency technology is the position or localisation of the loading, so that a location of the wear can be directly determined and rectified. The advantage of simple resistance measurement is the reduction in production costs and failure times as well as the simplicity of the solution for discovering damage to the corrugated hose.

By means of the electric conductor arrangement, the high-frequency conductor arrangement and the maximum-frequency conductor arrangement, information can be deducible or deduced in each case about a state change, for example bending or torsion, of the corrugated hose. For example, a change in the ohmic (electric) resistance of the conductor arrangement can be detected and a state change in the corrugated hose deduced thereby. In the event of an abrupt increase in the resistance towards infinity, a tear can be deduced, for example. In addition or alternatively to the monitoring of the electric resistance, a frequency of the signal carried in the conductor arrangement can be monitored. In the event of a frequency change in the signal a state change of the corrugated hose can be deduced.

From the optical conductor arrangement information can be deducible or deduced about a state change, for example bending or torsion, of the corrugated hose. This can be deduced, for example, from the optical signal conducted by the optical conductor arrangement. In an implementation of the conductor arrangement as optical conductor arrangement, for example as fibre optic (FO) conductor arrangement, deformations in the conduction cause changes in the pertinent physical properties. This can lead to changes in the propagation time of the signals conducted in the conductor arrangement or a premature back reflection of the signals conducted in the conductor arrangement, e.g. to a changed deflection of light conducted in the conductor arrangement.

The at least one conductor arrangement can have an electric conductor arrangement, e.g. the at least one conductor arrangement can be formed as an electric conductor arrangement. The electric conductor arrangement can be in a state of connection or be connected to a measuring device. The measuring device can be formed as an external element or as part of the conductor arrangement or as part of the corrugated hose. If it says here that a component "is connected" to another component, thus "communicates with" or "accesses it", this can mean that it is thus directly or indirectly connected or accesses this directly or indirectly. This means that the electric conductor arrangement can be connected directly or indirectly to the measuring device.

The measuring device can be formed to determine the change in the signal by a change in an electric resistance. The measuring device can be formed to determine the change in the signal by a change in an electric current. The measuring device can be formed to determine the change in the signal by a change in an electric voltage. In this case the respective changes in the electric resistance, the electric current or the electric voltage relate to the electric conductor arrangement.

The at least one conductor arrangement can have an optical conductor arrangement, e.g. the at least one conductor arrangement can be formed as an optical conductor arrangement. The optical conductor arrangement can be in a state of connection or be connected to a measuring device. The measuring device can be formed to determine the change in the signal by a change in an optical reflection. For example, the measuring device can be formed to determine a change in the reflection of an optical signal carried in the optical conductor arrangement, e.g. a change in the light reflection.

Information about a location of the damage to the corrugated hose can be deducible or deduced from the electric conductor arrangement. Information about a location of the damage to the corrugated hose can be deducible or deduced from the high-frequency conductor arrangement. Information about a location of the damage to the corrugated hose can be deducible or deduced from the maximum-frequency conductor arrangement. Information about a location of the damage to the corrugated hose can be deducible or deduced from the optical conductor arrangement. As explained, in an implementation of the conductor arrangement as an optical, e.g. fibre optic (FO) conductor arrangement, deformations of the conductor arrangement can cause changes in the pertinent physical properties. This can lead to changes in the propagation time of the signals carried in the conductor arrangement or a changed, e.g. premature, back reflection of the signals carried in the conductor arrangement. From the change in propagation time or the changed back reflection the location of the deformation of the conductor arrangement and thus the location of the damage to the corrugated hose can be determined, for example, by comparison with the propagation time or back reflection to be expected.

The corrugated hose can furthermore have an output device. The corrugated hose can furthermore be connectable or connected to the output device. The output device can be formed to output information about the damage to the corrugated hose. The output can take place e.g. visually and/or with the aid of audio.

Furthermore, the corrugated hose can have a communication unit. The corrugated hose can furthermore be connectable or connected to the communication unit. The communication unit can be formed to emit information about the damage to the corrugated hose. The information can contain various parameters, such as the existence of damage and/or the location of the damage and/or the time of the damage.

The corrugated hose can furthermore have at least one integrated circuit. The at least one integrated circuit can be formed to determine information about a temperature and/or information about a position. This can take place e.g. via periodically externally introduced Near Field Communication (NFC) or RFID (radio-frequency identification) tags or by means of printed circuits (printed electronics). In this case the information can supply information about the loading of the corrugated hose.

It is clear to the person skilled in the art that the explanations set out here can be in a state of implementation/be implemented using hardware circuits, software means or a combination thereof. The software means can be associated with programmed microprocessors or a general computer, an application specific integrated circuit (ASIC) and/or digital signal processors (DSPs). For example, the communication unit, the at least one integrated circuit and the output device can be realised partly as a computer, a logic circuit, a field programmable gate array (FPGA), a processor (comprising a microprocessor, a microcontroller (µC) or a vector processor, for example)/core (main memory, can be integrated into the processor or used by the processor)/central processing unit (CPU; wherein several processor cores are possible), a floating point unit (FPU), a numeric processing unit (NPU), an arithmetic logic unit (ALU), a coprocessor (additional microprocessor to support a main processor (CPU)), a general purpose computation on graphics processing unit (GPGPU), a parallel computer (for simultaneous execution, including on several main processors and/or graphics processors, of arithmetic operations) or a DSP.

Furthermore, it is clear to the expert that even if the details described here are described in relation to the corrugated hose, these details can also be realised in a suitable method for detecting damage to the corrugated hose, in a computer processor or a memory connected to a processor, wherein the memory is provided with one or more programs that implement the method when they are executed by the processor. In this case methods such as swapping and paging can be used.

Further objectives, features, advantages and application possibilities result from the following description of exemplary embodiments, which are not to be understood as restrictive, with reference to the associated drawings. Here all features described and/or depicted show by themselves or in any combination the subject matter disclosed here, even independently of their grouping in the claims or their references. The dimensions and proportions of the components shown in the figures are not necessarily to scale in this case; they may diverge from what is shown here in embodiments to be implemented.

BRIEF DESCRIPTION OF THE DRAWINGS

FIG. 1A shows a schematic depiction of a corrugated hose with a conductor arrangement in a longitudinal view;

FIG. 1B shows a schematic depiction of a corrugated hose with a conductor arrangement in a transverse view;

FIG. 1C shows a schematic depiction of a cross section of a corrugated hose with a conductor arrangement.

DETAILED DESCRIPTION

Figure 2:
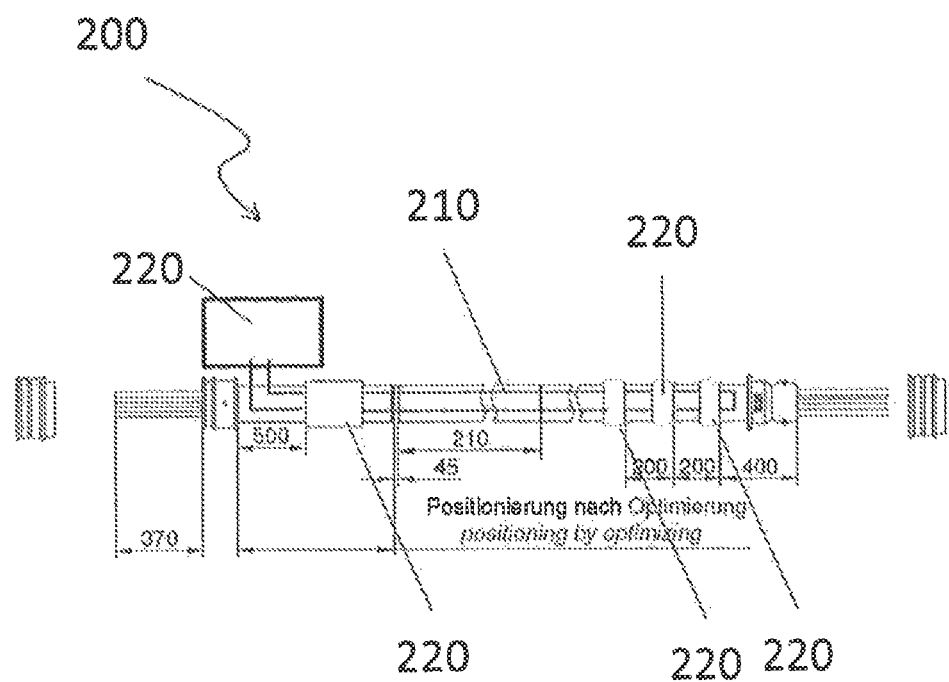
FIG. 2 shows a schematic depiction of a longitudinal section of a corrugated hose and a positioning by assembly/optimisation for the corrugated hose.

In the following, without being restricted hereto, specific details are set out to provide a complete understanding of the present disclosure. However, it is clear to a person skilled in the art that the present disclosure can be used in other exemplary embodiments that may deviate from the details set out below.

The method variants of the functional and operational aspects described here, as well as the functional and operational aspects thereof, serve purely for a better understanding of their structure, mode of operation and properties; they do not restrict the disclosure to the exemplary embodiments, for instance. The figures are partly schematic, wherein substantial properties and effects are depicted in part enlarged or reduced, in order to clarify the functions, active principles, technical configurations and features. Here each mode of operation, each principle, each technical configuration and each feature which is/are disclosed in the figures or in the text can be combined freely and in any way with all claims, each feature in the text and in the other figures, other modes of operation, principles, technical configurations and features that are contained in this disclosure or result from it, so that all conceivable combinations are to be associated with the devices described. Combinations between all individual implementations in the text, meaning in each section of the description, in the claims and also combinations between different variants in the text, in the claims and in the figures are also comprised here and can be made the subject matter of further claims. Nor do the claims limit the disclosure and thus the combination possibilities of all features demonstrated with one another. All disclosed features are disclosed here explicitly also individually and in combination with all other features.

It is likewise understood that the terms used here serve only to describe individual embodiments and should not be regarded as a limitation. Unless otherwise defined, all technical and scientific terms used here have the meaning that corresponds to the general understanding of the expert in the specialist field relevant for the present disclosure; they are to be interpreted neither too broadly nor too narrowly. If specialist terms are used here inappropriately and thus do not give expression to the technical idea of the present disclosure, these should be replaced by specialist terms that convey a correct understanding to the expert. The general terms used here should be interpreted on the basis of the definition found in the dictionary or according to the context; too narrow an interpretation is to be avoided in this case.

It should be understood here that terms such as e.g. "comprise" or "have" etc. signify the presence of the described features, figures, operations, actions, components, parts or their combinations and do not exclude the presence or the possible addition of one or more other features, figures, operations, actions, components, parts or their combinations. The term "and/or" comprises both combination of the several objects in communication with one another and each object of this plurality of the described plurality of objects.

The preferred embodiments of the present disclosure are described below with reference to the enclosed drawings; here similar components are always provided with identical reference signs. In the description of the present disclosure, detailed explanations of known associated functions or structures are dispensed with if these detract unnecessarily from the sense of the present disclosure; such functions and structures are comprehensible to the expert, however. The enclosed drawings of the present disclosure serve to illustrate the present disclosure and should not be regarded as a limitation. The technical idea of the present disclosure is to be interpreted in such a way that in addition to the enclosed drawings it comprises all such modifications, changes and variants.

In the figures, components corresponding to one another or similar in function are provided with identical or similar reference signs. The corrugated hose is now described by means of exemplary embodiments.

FIG. 1A shows a schematic depiction of a corrugated hose 100 with a conductor arrangement 110 in a longitudinal view. FIG. 1B shows a schematic depiction of a corrugated hose 100 with a conductor arrangement 110 in a view in perspective. FIG. 1C shows a schematic depiction of a cross section of a corrugated hose 100 with a conductor arrangement 110. In FIGS. 1A and 1B another unit 120 is also depicted (not depicted in FIG. 1C). The unit 120 can also be mounted in a section inside or outside the corrugated hose 100. Furthermore, more units 120 can also be provided. The unit 120 can have an output s device 120, a communication unit 120, a measuring device and/or an integrated circuit 120, for example, or be formed as such.

The corrugated hose 100 has a bellows-shaped structure and is bendable in a longitudinal direction and transverse direction by virtue of this structure. The conductor arrangement 110 in one embodiment is an electric conductor, which when loaded changes its impedance, for example its resistance. In the event of a tear, the resistance goes towards infinity. This loading can be detected via the measuring device 120 and thus damage to the conductor arrangement can be deduced.

Due to the arrangement of the conductor arrangement on, at or in the corrugated hose, damage to the corrugated hose can be deduced from the damage to the conductor arrangement.

The measuring device 120 can further be formed as a high-frequency technology wave generation/wave detection unit 120. The measuring device 120 can then discover faults in or on the conductor arrangement 110, which is an electric waveguide in this case, via a propagation time measurement. The measuring device 120 can thus also be implemented as an optical measuring device 120, so that a light wave can be sent through the conductor arrangement 110, in order to discover the location of the fault by means of the reflection at such a fault, which can arise due to loading.

The conductor arrangement 110 can be mounted in or on the corrugated hose, or in, at or on a liner of the corrugated hose 100. In this case the conductor arrangement 110 can be introduced into the liner of the corrugated hose 100 or mounted on an inner side of the liner of the corrugated hose 100 or on an inner side of the corrugated hose 100. Furthermore, the conductor arrangement 110 can be attached to the liner of the corrugated hose 100 or to the corrugated hose 100. The conductor arrangement 110 can further be introduced into an interior space of the corrugated hose 100.

As described, the measuring device 120 in one embodiment can determine the change in the signal caused by damage to the corrugated hose 100 by a change in a resistance, an electric current or an electric voltage based on measurements on the conductor arrangement. The same applies to a conductor arrangement that is an electric conductor arrangement 110, high-frequency conductor arrangement 110, a maximum-frequency conductor arrangement 110 or an optical conductor arrangement 110. Monitoring of the respective conductor arrangement, i.e. carrying out the respective measurement(s), can take place on an ongoing basis, e.g. continuously or at periodic intervals. The shorter the intervals/the more measurements per s unit of time, the more accurately or the sooner damage to the corrugated hose can be detected.

The electric conductor arrangement 110, the high-frequency conductor arrangement 110, the maximum-frequency conductor arrangement 110 and also the optical conductor arrangement 110 serve in this case as information carriers to provide information about the bending of the corrugated hose 100. This information is thus deducible due to a change in the respective conductor arrangement. Furthermore, on the basis of propagation time measurement with the aid of high-frequency sensor circuits (not shown, but capable of implementation in unit 120) information can be deduced about a location of the damage to the corrugated hose 100. The information, for example the location of the damage or the bending of the corrugated hose 100, can be output via the output device 120. This information can also be emitted via the communication unit 120.

The mounting of the conductor arrangement 110 on or in the corrugated hose 100 can be optimised so that it is mounted along anticipated predetermined breaking points, so that the fastest possible discovery of damage leads to a speedy repair, improved maintenance and fewer failures of an installation.

Inside the corrugated hose 100 an integrated circuit 120 can also be mounted, which can supply both temperature and information about a location on, at or in the corrugated hose.

FIG. 2 shows a schematic depiction of a longitudinal section of a corrugated hose 200 and a positioning by assembly/optimisation for the corrugated hose 200. The corrugated hose 200 can accordingly be equipped with a conductor arrangement 210 such that it satisfies customer-specific requests. A higher effectiveness of the arrangement of corrugated hose 200 and conductor arrangement 210 can thus be provided. Dimensions with regard to different sections in the corrugated hose 200 are also indicated in FIG. 2, as is desirable in a positioning by optimisation or assembly for a customer. In this figure a plurality of units 220 are introduced into or mounted on the corrugated hose 200, so that the functions according to FIG. 1 can be implemented via the respective units 220 (see 120 in FIG. 1), namely measuring device 220, output device 220, communication unit 220 and the integrated circuit 220.

Although the present disclosure has been described in connection with the embodiments, it is obvious to the person skilled in the art that the present disclosure can be changed and modified in different ways without departing from the scope of protection of the present disclosure established in the enclosed claims.

The invention claimed is:

1. Corrugated hose, which has at least one conductor arrangement, wherein the conductor arrangement is mounted on the corrugated hose or introduced into the corrugated hose in such a manner that damage to the at least one conductor arrangement causes a change in a signal carried in the at least one conductor arrangement such that damage to or a state change in the corrugated hose can be deduced from the change in the signal, wherein the conductor arrangement is mounted on the corrugated hose or introduced into the corrugated hose along anticipated predetermined breaking points, wherein each of the at least one conductor arrangement comprises a single, elongated wire having first and second ends positioned at the same end of the corrugated hose.

2. Corrugated hose according to claim 1, wherein the at least one conductor arrangement is introduced into a liner of the corrugated hose, or is mounted on an inner side of a liner of the corrugated hose or on an inner side of the corrugated hose.

3. Corrugated hose according to claim 1, wherein the at least one conductor arrangement is attached to a liner of the corrugated hose or to the corrugated hose.

4. Corrugated hose according to claim 1, wherein the at least one conductor arrangement is introduced into an interior space of the corrugated hose.

5. Corrugated hose according to claim 1, wherein the at least one conductor arrangement is an electric conductor arrangement, a high-frequency conductor arrangement, a maximum-frequency conductor arrangement or an optical conductor arrangement or is formed as such.

6. Corrugated hose according to claim 5, wherein information can be deduced from the electric conductor arrangement, the high-frequency conductor arrangement, the maximum-frequency conductor arrangement or the optical conductor arrangement regarding a state change, for example bending or torsion, of the corrugated hose.

7. Corrugated hose according to claim 5, wherein information can be deduced from the electric conductor arrangement, the high-frequency conductor arrangement, the maximum-frequency conductor arrangement or the optical conductor arrangement regarding a location of the damage to the corrugated hose.

8. Corrugated hose according to claim 1, wherein the at least one conductor arrangement has an electric conductor arrangement or is formed as such, and the electric conductor arrangement is connectable to a measuring device, which is formed to determine the change in the signal by a change in an electric resistance, a change in an electric current or a change in an electric voltage.

9. Corrugated hose according to claim 1, wherein the at least one conductor arrangement has an optical conductor arrangement or is formed as such, and the optical conductor arrangement is connectable to a measuring device, which is formed to determine the change in the signal by a change in an optical reflection.

10. Corrugated hose according to claim 1, wherein the corrugated hose further has an output device or is connectable to such a device, which is formed to output information about the damage to the corrugated hose.

11. Corrugated hose according to claim 1, wherein the corrugated hose further has a communication unit or is connectable to such a unit, which is formed to emit information about the damage to the corrugated hose.

12. Corrugated hose according to claim 1, wherein the corrugated hose further has at least one integrated circuit.

13. Corrugated hose according to claim 12, wherein the at least one integrated circuit is formed to determine information about a temperature and/or information about a position.

14. Corrugated hose according to claim 1, wherein the at least one conductor extends along an interior of the corrugated hose.

15. Corrugated hose according to claim 1, wherein the at least one conductor extends along an exterior of the corrugated hose.

* * * * *